UNITED STATES PATENT OFFICE.

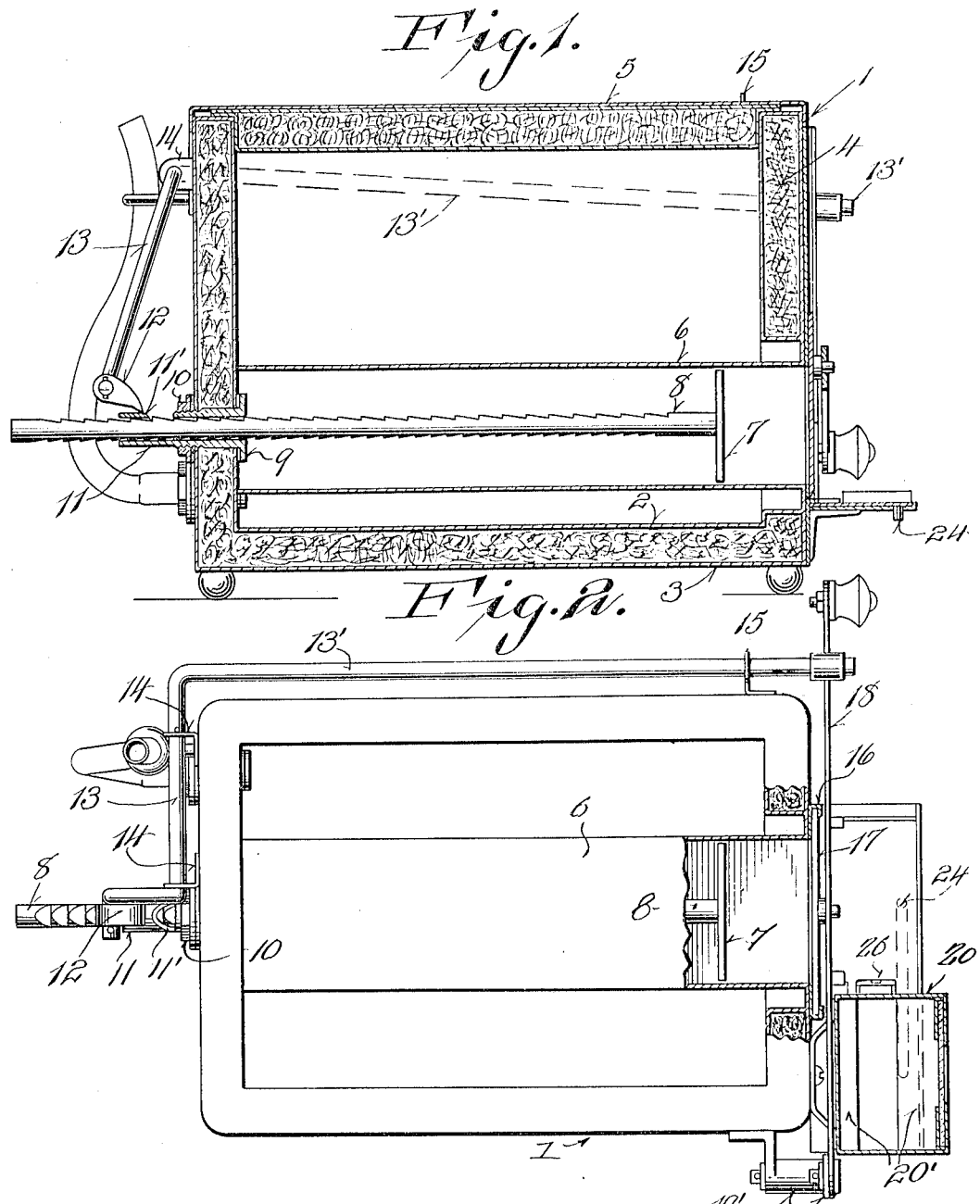

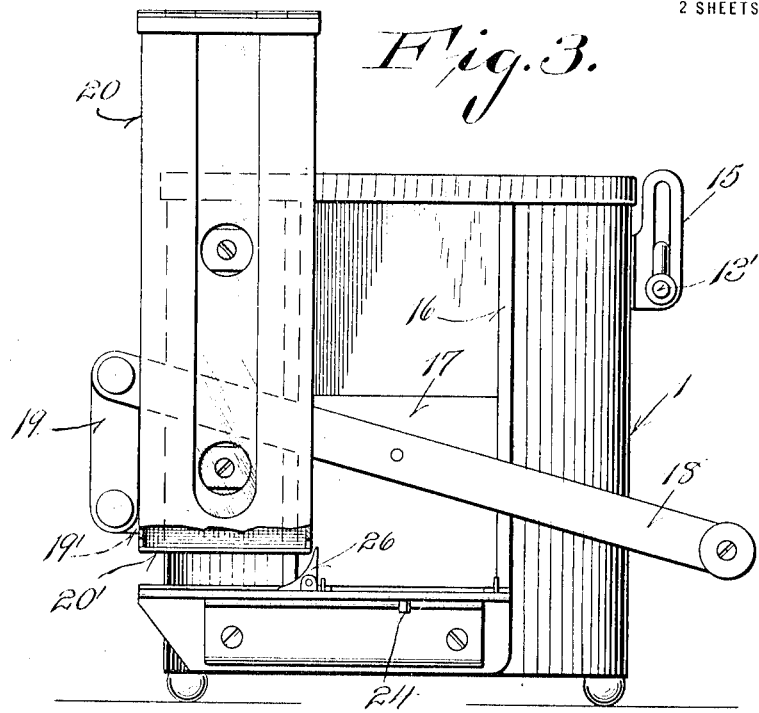

ARTHUR LEICH AND JESSE S. BERNER, OF MILWAUKEE, WISCONSIN.

ICE-CREAM-SANDWICH MACHINE.

1,309,643.   Specification of Letters Patent.   Patented July 15, 1919.

Application filed October 3, 1918. Serial No. 256,679.

*To all whom it may concern:*

Be it known that we, ARTHUR LEICH and JESSE S. BERNER, citizens of the United States, and residents of Milwaukee, in the county of Milwaukee and State of Wisconsin, have invented certain new and useful Improvements in Ice-Cream-Sandwich Machines; and we do hereby declare that the following is a full, clear, and exact description thereof.

This invention relates to ice cream machines and more particularly to that type of machines for making ice cream sandwiches.

The invention has primarily for its object to provide a machine of this character which in comparison with machines of similar type is greatly simplified in construction and at the same time more efficient and sanitary.

A more particular object of the invention is to provide a machine of this class in which the feed bar is provided with notches of different length to permit different sized cuts of ice cream.

A further object is to provide a machine of this character in which the feeding means is normally disengaged whereby manual operation of the plunger in either direction is permitted.

With these and other objects in view which will be apparent as the description proceeds, my invention resides in the novel features of construction, combination and arrangement of parts as hereinafter described and defined by the appended claims, it being understood that changes in the precise embodiment might be made by those skilled in the art without departing from the spirit of the invention.

This invention in one practical form in which it may be embodied is illustrated in the accompanying drawing in which:—

Figure 1 is a sectional view taken through a machine embodying the features of the invention.

Fig. 2 is an elevational plan view of the invention with parts broken away and in section and the cover removed.

Fig. 3 is a front elevational view of the invention.

Fig. 4 is a detailed plan view of the biscuit and ice cream receiver, and

Fig. 5 is a detailed view of the detachable receiving tray.

Referring now more particularly to the accompanying drawings 1 designates an ice cream receptacle comprising an inner and outer metallic jacket 2 and 3 respectively, between which is packed a suitable insulation 4. The top of the receptacle is provided with a cover 5 similar in construction to the walls of the receptacle. Contained within the ice receptacle is an ice cream casing having its forward end open to permit insertion of the ice cream while its rearward end abuts and is closed by the rear wall of the ice receptacle. About the casing at its forward end the inner jacket of the ice receptacle is spaced apart from the casing sufficiently to permit ice to come in contact with the end of the casing thereby insuring proper packing of the same throughout its entire length.

Reciprocatively mounted within the casing is a plunger 7 provided with a toothed feed bar 8 extending rearwardly from the plunger beyond one end of the casing. It will be noted as best shown in Fig. 1 that the feed bar is provided with two sets of teeth that vary in length. This permits a varying feed of the plunger depending upon the set of teeth to be engaged. The rear wall of the receptacle is provided with a guide thimble 9 secured thereto by means of a lock nut 10 and adapted to receive the feed bar 8. The rearward projection 11 of the thimble is provided with a suitable cutout 11' to permit a pawl 12 which is disposed over the feed bar and normally held out of engagement with the same by the extension 11 to engage the teeth. The pawl 12 is pivotally connected to the end of a feed arm 13 which is mounted in brackets 14 secured to the rear end of the receptacle and is provided with an arm 13' extending forwardly of the receptacle. Secured to the side of the receptacle and provided with a guide slot for the arm 13' is another bracket 15.

Mounted upon the front of the receptacle adjacent the sides of the ice cream casing are vertical guides 16 having mounted therein a reciprocating cutter 17 to which an actuating arm 18 is pivotally connected. One end of the actuating arm is secured to a bracket 19, carried by the receptacle, by means of a link 19'. The opposite end of the actuating arm is extended laterally sufficiently to permit the same upon operation to engage the arm 13' thereby transmitting motion to the feed arm 13. Thus it will be seen that the pivotal dog 12 will enter the cut-out portion 11' to engage the teeth of the feed bar 8 and will transmit a step by step movement to the same.

Secured to the front of the receptacle and spaced therefrom is a biscuit container 20 having its bottom end open and provided with retaining flanges 20'. Between these flanges and the lower end of the biscuit container is sufficient space to permit a biscuit to be removed horizontally from the container. Positioned below the biscuit container and secured to the receptacle adjacent the open end of the ice cream casing, is a support 21 having reciprocatively mounted thereon a plate 22 guided in its reciprocating movement by the flanges 23 of the support. The reciprocating movement of the plate is limited by the pin 24 carried by the plate and engaging the slot 25 provided in the support. Pivotally mounted upon the plate 22 is a dog 26 which upon movement of the plate in one direction is adapted to pass under the biscuits held in the container and upon movement in the opposite direction will project upward between the flanges 20' and engage a biscuit to feed the same from the container on to the detachable tray 27 carried by the reciprocating plate.

In operation the receptacle is properly packed with ice and the plunger 7 is drawn toward the rear end of the casing 6 to permit a brick of cream to be inserted. The container 20 is then filled with biscuits which are to be used in connection with slices of ice cream from the newly inserted brick to form the sandwiches.

The sanitary detachable tray 27 being placed on the plate 22, the latter may be readily moved toward the biscuit container whereby to position the tray beneath the open end thereof; such movement also disposes the dog 26 at the outer end of the lowermost biscuit. The reciprocative plate 22 is now ready to be moved in an opposite directon by means of the handle of the tray 27 to deposit said lowermost biscuit on the latter, this biscuit being removed from its container by the dog 26 as is hereinbefore set forth. When the movement of the plate 22 and the tray 27 in the last mentioned direction is limited by the engagement of the stop 24 with the end of the slot 25, the recently removed biscuit will be properly positioned to receive a cut of ice cream.

The proper quantity of cream is severed from the brick by the successive raising and lowering of the cutter 17, the first mentioned movement causing the brick to be projected outwardly a predetermined distance owing to the engagement of the handle 18 with the feed arm 13'.

The next step in the formation of the sandwich is the addition of the top biscuit, which is also supplied by the container 20. This biscuit is removed from said container in the same manner that the initial biscuit was secured, that is to say by the reciprocation of the plate 22 and the tray 27.

The completed sandwich is handed to the customer on the detachable tray 27, and said customer readily removes the sandwich from the tray without touching the latter owing to the cutout portion as is clearly shown in Fig. 4.

From the foregoing description it will be noted that an ice cream sandwich machine has been perfected of simple and efficient construction in which the different parts are readily accessible in order to clean the same.

What is claimed is:

1. An ice cream sandwich machine comprising a receptacle, a casing disposed within the receptacle, a plunger reciprocatively mounted within the casing, a feed bar extending from the plunger, and means for selectively moving the plunger varying distances.

2. An ice cream sandwich machine comprising a receptacle, a casing disposed within the receptacle, a plunger reciprocatively mounted within the casing, a toothed feed bar extending from the plunger beyond the casing, a feed arm having a pawl engaging the feed bar, and a guide thimble for the feed bar adapted to normally hold the pawl out of engagement with said feed bar.

3. An ice cream sandwich machine comprising an ice receptacle, an open end casing disposed within the receptacle, a plunger reciprocatively mounted within the casing, a toothed feed bar extending from the plunger beyond one end of the casing, a feed arm having a pawl engaging the feed bar, means for normally holding the pawl out of engagement with the feed bar, a reciprocative cutter in slidable engagement with the open end of the casing, and a manually operated actuating arm for the cutter, said actuating arm being adapted to engage the feed arm upon its operation.

4. An ice cream sandwich machine comprising an ice receptacle, an open end casing disposed within the receptacle, a plunger reciprocatively mounted within the casing, a toothed feed bar extending from the plunger beyond one end of the casing, a feed arm having a pawl engaging the feed bar, means for normally holding the pawl out of engagement with the feed bar, a reciprocative cutter in slidable engagement with the open end of the casing, a manually operated actuating arm for the cutter, said actuating arm being adapted to engage the feed arm upon its operation, a biscuit container secured to the front end of the receptacle, a support attached to the receptacle adjacent the open end of the casing and positioned below the biscuit container, a reciprocating plate slidably mounted upon the support, and means carried by the plate for selecting biscuits from the container upon reciprocation of said plate.

5. An ice cream sandwich machine comprising a receptacle, a casing disposed within the receptacle, a plunger reciprocatively mounted within the casing, a feed bar extending from the plunger beyond the casing, said feed bar having a plurality of toothed surfaces, and means for imparting motion to the plunger.

6. An ice cream sandwich machine comprising a receptacle, a casing disposed within the receptacle, a plunger reciprocatively mounted within the casing, a feed bar extending from the plunger beyond the casing, said feed bar having a plurality of toothed surfaces, a feed arm having a pawl for engaging one of the toothed surfaces of the feed bar, means for normally holding the pawl out of engagement with the feed bar, a reciprocative cutter in slidable engagement with the open end of the casing, and a manually operated actuating arm for the cutter, said actuating arm being adapted to engage the feed arm upon its operation.

7. An ice cream sandwich machine comprising a receptacle, a casing disposed within the receptacle, a plunger reciprocatively mounted within the casing, a feed bar extending from the plunger beyond the casing, said feed bar having a plurality of toothed surfaces, a feed arm having a pawl for engaging one of the toothed surfaces of the feed bar, means for normally holding the pawl out of engagement with the feed bar, a reciprocative cutter in slidable engagement with the open end of the casing, a manually operated actuating arm for the cutter, said actuating arm being adapted to engage the feed arm upon its operation, a biscuit container secured to the forward end of the receptacle, a support positioned below the biscuit container and adjacent the open end of the casing, a reciprocating plate slidably mounted upon the support, and means carried by the plate for feeding biscuits from the container.

In testimony that we claim the foregoing we have hereunto set our hands at Milwaukee, in the county of Milwaukee and State of Wisconsin.

ARTHUR LEICH.
JESSE S. BERNER.